(12) United States Patent
Shioiri et al.

(10) Patent No.: US 9,802,466 B2
(45) Date of Patent: Oct. 31, 2017

(54) BACKUP CONTROLLER

(71) Applicant: HONDA MOTOR CO., LTD., Tokyo (JP)

(72) Inventors: Kenji Shioiri, Wako (JP); Mizuki Katsu, Wako (JP); Kazunari Ochi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 18 days.

(21) Appl. No.: 15/095,800

(22) Filed: Apr. 11, 2016

(65) Prior Publication Data
US 2016/0301332 A1 Oct. 13, 2016

(30) Foreign Application Priority Data

Apr. 9, 2015 (JP) .................... 2015-079927

(51) Int. Cl.
| | |
|---|---|
| H02P 1/02 | (2006.01) |
| B60J 5/06 | (2006.01) |
| H02P 7/03 | (2016.01) |
| E05F 15/695 | (2015.01) |
| H02P 29/032 | (2016.01) |
| E05F 15/611 | (2015.01) |

(52) U.S. Cl.
CPC .............. *B60J 5/06* (2013.01); *E05F 15/695* (2015.01); *H02P 7/05* (2016.02); *H02P 29/032* (2016.02); *E05F 15/611* (2015.01); *E05Y 2400/504* (2013.01); *E05Y 2400/612* (2013.01); *E05Y 2800/246* (2013.01); *E05Y 2900/531* (2013.01); *E05Y 2900/55* (2013.01)

(58) Field of Classification Search
CPC ...................................................... H02P 1/022
USPC .......................................... 318/256, 255, 34
See application file for complete search history.

(56) References Cited

U.S. PATENT DOCUMENTS 6,002,225 A * 12/1999 Gleim ....................... B60L 7/12
318/293

FOREIGN PATENT DOCUMENTS

| JP | 2-54317 A | 2/1990 |
|---|---|---|
| JP | 11-166723 A | 6/1999 |
| JP | 2000-308391 A | 11/2000 |
| JP | 2001-14001 A | 1/2001 |
| JP | 2001-169366 A | 6/2001 |

(Continued)

OTHER PUBLICATIONS

Office Action dated Aug. 16, 2016, issued in counterpart Japanese Application No. 2015-079927. (4 pages).

*Primary Examiner* — David S Luo
(74) *Attorney, Agent, or Firm* — Westerman, Hattori, Daniels & Adrian, LLP

(57) ABSTRACT

A backup controller which is capable of suppressing an unintended operation performed by a motor which rotates in both of a normal rotation direction and a reverse rotation direction is provided. The control unit of the backup controller activates the second relay and the backup circuit in a case where a state in which the motor is rotating in the first direction even though the first relay is not activated is transmitted from the monitoring unit. Further, the control unit activates the first relay and the backup circuit in a case where a state in which the motor is rotating in the second direction even though the second relay is not activated is transmitted from the monitoring unit.

4 Claims, 3 Drawing Sheets

(56) References Cited

FOREIGN PATENT DOCUMENTS

JP 2005-80384 A 3/2005

* cited by examiner

BACKUP CONTROLLER

CROSS REFERENCES TO RELATED APPLICATIONS

The present application claims priority under 35 U.S.C. §119 to Japanese Patent Application No. 2015-079927, filed Apr. 9, 2015, entitled "Backup Controller." The contents of this application are incorporated herein by reference in their entirety.

BACKGROUND

1. Field

The present disclosure relates to a backup controller which backs up power supply to a control unit which controls a motor which rotates in both of a normal rotation direction and a reverse rotation direction.

2. Description of the Related Art

There is the configuration in which an operation to two opposite directions such as an operation of a door or a power window of a vehicle (that is, an opening operation and a closing operation) is performed by drive of a motor corresponding to an operation by a user with respect to a switch (for example, Japanese Unexamined Patent Application Publication No. 2001-014001).

Japanese Unexamined Patent Application Publication No. 2001-014001 relates to a power window controller for automobile and the like (the name of the disclosure). In Japanese Unexamined Patent Application Publication No. 2001-014001, when a movable contact 12 of a manual operation switch 11 is connected to a fixed contact 13 for pull-up (S1: NO→S3: YES in FIG. 2), a microcomputer main body 20 switches a movable contact 42 of a switching relay 40A to a fixed contact 43 (S4). Accordingly, a motor M is rotated in a pull-up direction so as to move a windowpane to the opening direction (S5) ([0029], [0030]).

Further, when the movable contact 12 of the manual operation switch 11 is connected to a fixed contact 14 for pull-down (S1: NO→S3: NO in FIG. 2), the microcomputer main body 20 switches a movable contact 46 of a switching relay 40B to a fixed contact 47 (S6). Accordingly, the motor M is rotated in a pull-down direction so as to move a windowpane to the closing direction (S7) ([0031]).

SUMMARY

In Japanese Unexamined Patent Application Publication No. 2001-014001, a case where an on-failure occurs in either of the switching relays 40A and 40B is not discussed. For example, in a case where the movable contact 42 of the switching relay 40A is kept to be connected to the fixed contact 43 even though a signal from the microcomputer main body 20 is not inputted, the motor M is kept to drive in the pull-up direction.

In light of the above-mentioned problem, it is desirable to provide a backup controller which is capable of suppressing an unintended operation performed by a motor which rotates in both of a normal rotation direction and a reverse rotation direction.

A backup controller according to the present disclosure includes a power source, a motor, a first switch and a second switch which are operable by a user, a control unit (which can also simply be referred to as a controller) which activates a first relay which rotates the motor in a first direction when the first switch is operated and activates a second relay which rotates the motor in a second direction which is opposite to the first direction when the second switch is operated, a motor power line which supplies power to the motor when the first relay or the second relay is activated and the power source and the motor are connected with each other, a control unit power line (which can also simply be referred to as a controller power line) which connects the power source and the control unit so as to supply power to the control unit, a backup circuit which is made supply power from the motor power line to the control unit power line by the control unit, and a monitoring unit such as a monitoring circuit (which can also simply be referred to as a monitor) which monitors a rotation direction of the motor and transmits the rotation direction to the control unit, and the control unit activates the second relay and the backup circuit in a case where a state in which the motor is rotating in the first direction even though the first relay is not activated is transmitted from the monitoring unit and activates the first relay and the backup circuit in a case where a state in which the motor is rotating in the second direction even though the second relay is not activated is transmitted from the monitoring unit.

According to the present disclosure, in a case where the state in which the motor is rotating in the first direction even though the first relay is not activated (that is, an on-failure state of the first relay) is generated, the second relay is activated. A closing circuit is thus formed so as to be able to stop the motor. At this time, power supply to the control unit is secured by activating the backup circuit even if the control unit power line is disconnected. Thus, even when the control unit power line is disconnected, the motor can be securely stopped in the on-failure state of the first relay. The same goes for a case of generation of the state in which the motor is rotating in the second direction even though the second relay is not activated (that is, an on-failure state of the second relay).

A first fuse may be disposed on the motor power line, and a second fuse rated current of which is smaller than that of the first fuse may be disposed on the control unit power line. The backup circuit may be connected between a downstream side or an upstream side of the first fuse and a downstream side of the second fuse.

Due to the rated current smaller than that of the first fuse, the second fuse of the control unit power line easily blows. According to the above-described configuration, the backup circuit is connected on the downstream side of the second fuse. Therefore, even if the control unit power line is disconnected due to blowing of the second fuse, the motor can be securely stopped in the on-failure state of the first relay or the second relay.

A capacitor which is grounded between the backup circuit and the control unit may be provided on the control unit power line. Accordingly, even if the second fuse of the control unit power line blows, the control unit can activate the backup circuit to maintain the operation of the control unit while the control unit is run by power of the capacitor. Therefore, even if the control unit power line is disconnected due to blowing of the second fuse, for example, the motor can be securely stopped in the on-failure state of the first relay or the second relay.

A step-down circuit which steps down a voltage of the control unit power line may be provided between the backup circuit and the control unit on the control unit power line, and the capacitor may be grounded between the step-down circuit and the control unit. Accordingly, the capacitor is charged with a voltage stepped down by the step-down circuit. Even in a case where an operation of the step-down circuit momentarily becomes unstable because the control unit power line is disconnected on the upstream side of the step-down circuit, for example, the control unit can stably operate due to power supply from the capacitor with a voltage which is already stepped down.

According to the present disclosure, an unintended operation performed by a motor which rotates in both of the normal rotation direction and the reverse rotation direction can be suppressed.

DESCRIPTION OF THE PREFERRED EMBODIMENT

A. An Embodiment

A1. Configuration of Vehicle 10

(A1-1. Entire Configuration of Vehicle 10)

Figure 1:
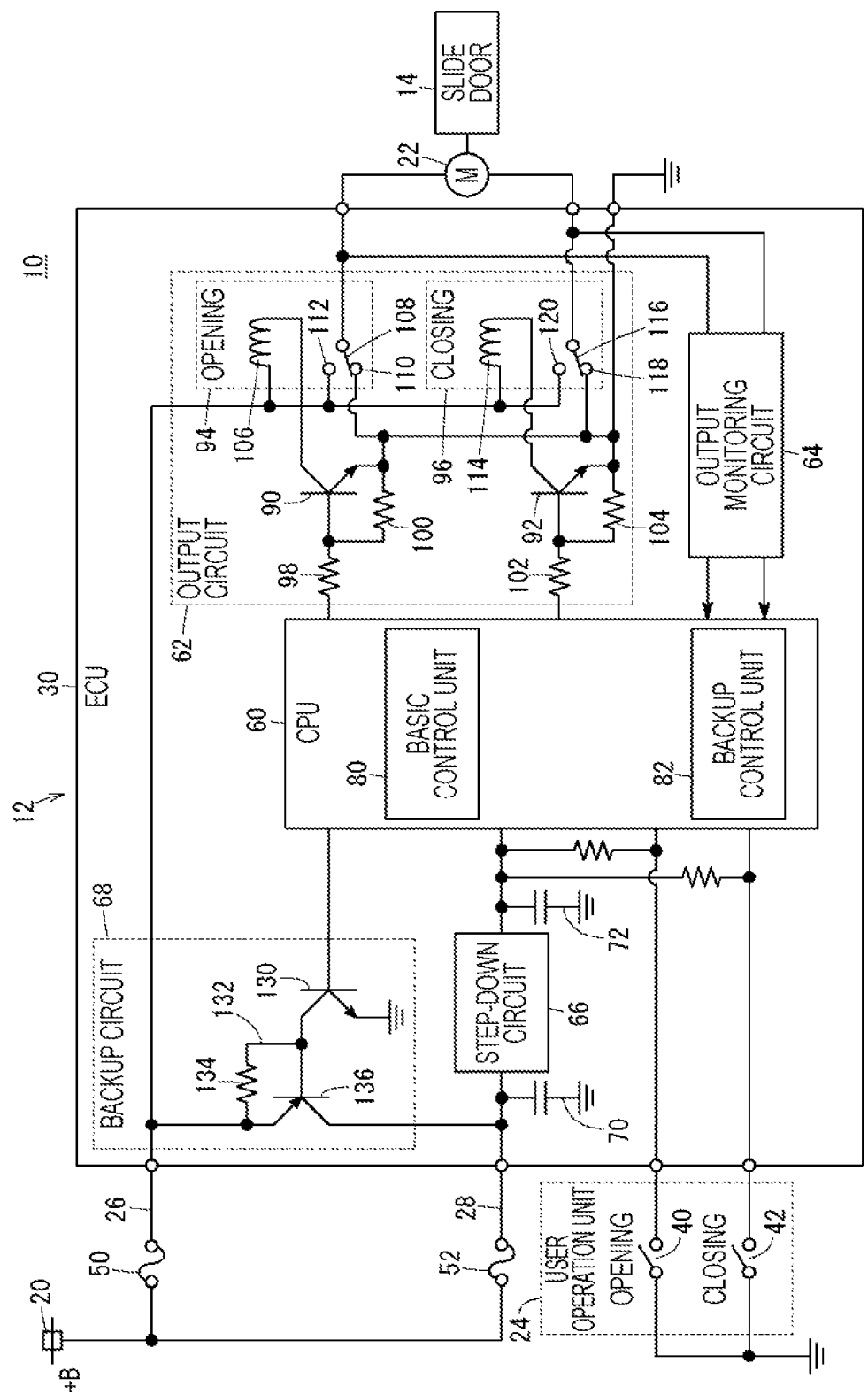
FIG. 1 schematically illustrates a part of a vehicle on which a slide door opening/closing device serving as a backup controller according to an embodiment of the present disclosure is mounted.

FIG. 1 schematically illustrates a part of a vehicle 10 on which a slide door opening/closing device 12 (hereinafter, also referred to as the "opening/closing device 12") serving as a backup controller according to an embodiment of the present disclosure is mounted. The opening/closing device 12 of this embodiment opens/closes a slide door 14 of the vehicle 10 in response to an operation of a user. The opening/closing device 12 includes a power source 20, a motor 22, a user operation unit 24, a first power line 26, a second power line 28, and an electronic control unit 30 (hereinafter, referred to as the "ECU 30").

(A1-2. Power Source 20)

The power source 20 is used for the motor 22 and the ECU 30 and is a lead battery of 12 V in this embodiment. Another power storage device or power generation device (for example, a lithium ion battery, a generator, a fuel cell, or a capacitor) may be employed as long as the device functions for the motor 22 and the ECU 30.

(A1-3. Motor 22)

The motor 22 is a DC motor and rotates in a normal rotation direction and a reverse rotation direction in accordance with a command from the ECU 30. A direction in which the slide door 14 is opened is defined as the normal rotation direction and a direction in which the slide door 14 is closed is defined as the reverse rotation direction in this example. However, the normal rotation direction and the reverse rotation direction may be defined reversely. Here, a transmission mechanism (not illustrated) which converts a rotary motion of the motor 22 into a linear motion or the like of the slide door 14 and transmits the linear motion or the like is interposed between the motor 22 and the slide door 14.

(A1-4. User Operation Unit 24)

The user operation unit 24 is a portion by which a user performs an operation on opening/closing of the slide door 14 and which includes a first operation switch 40 and a second operation switch 42. Hereinafter, the first operation switch 40 is also referred to as the "first switch 40", the "operation switch 40", the "opening switch 40", or the "switch 40". In a similar manner, the second operation switch 42 is also referred to as the "second switch 42", the "operation switch 42", the "closing switch 42", or the "switch 42".

The first switch 40 and the second switch 42 are switches operable by a user and are button-type switches in this embodiment. Switches other than the button-type switch (for example, a slide switch or a seesaw switch) may be used as the first switch 40 and the second switch 42. In a case where the first switch 40 and the second switch 42 are constituted by slide switches, for example, on/off of the first switch 40 and the second switch 42 can be switched by a single operation element.

(A1-5. First Power Line 26 and Second Power Line 28)

The first power line 26 (hereinafter, also referred to as the "motor power line 26") connects the power source 20 and the motor 22 to each other. On the first power line 26, a first fuse 50, a first relay 94, and a second relay 96 are disposed.

The second power line 28 (hereinafter, also referred to as the "CPU power line 28") connects the power source 20 and a central processing unit 60 of the ECU 30 to each other. On the second power line 28, a second fuse 52 and a step-down circuit 66 are disposed. Rated current of the second fuse 52 is smaller than that of the first fuse 50. That is, current for operating the motor 22 flows in the first fuse 50, so that rated current is set relatively large. On the other hand, current for operating the ECU 30 (specifically, the central processing unit 60 which will be described later) flows in the second fuse 52, so that rated current is set relatively small. Further, to the second power line 28, a first capacitor 70 and a second capacitor 72 are connected. Furthermore, between the first power line 26 and the second power line 28, a backup circuit 68 is connected.

Here, the motor power line 26 and the CPU power line 28 are separately provided in this embodiment and therefore, dark current in the motor power line 26 can be reduced. Further, an electronic control unit other than the ECU 30 (another ECU) may be connected to the CPU power line 28.

(A1-6. ECU 30)

(A1-6-1. Entire Configuration of ECU 30)

The ECU 30 controls an operation of the motor 22 and opening/closing of the slide door 14 in response to an operation with respect to the operation switches 40 and 42 by a user. As illustrated in FIG. 1, the ECU 30 includes the central processing unit 60 (hereinafter, referred to as the "CPU 60"), an output circuit 62, an output monitoring circuit 64 (hereinafter, also referred to as the "monitoring circuit 64"), the step-down circuit 66, the backup circuit 68, the first capacitor 70, and the second capacitor 72.

(A1-6-2. CPU 60)

The CPU 60 is a control circuit which controls the output circuit 62 based on an input from the operation switches 40 and 42 and the monitoring circuit 64. The CPU 60 includes a slide door basic control unit 80 (hereinafter, also referred to as the "basic control unit 80") and a backup control unit 82.

The basic control unit 80 executes slide door basic control (hereinafter, also referred to as the "basic control"). The basic control is control for opening/closing the slide door 14 in response to an operation with respect to the switches 40 and 42 by a user (details will be described later in reference to FIG. 2).

The backup control unit 82 executes on-failure monitoring control (hereinafter, also referred to as the "monitoring control"). The monitoring control is control for monitoring an occurrence of an on-failure in the output circuit 62 and stopping the motor 22 when an occurrence of the on-failure is detected (details will be described later in reference to FIG. 3).

(A1-6-3. Output Circuit 62)

The output circuit 62 controls power supply from the power source 20 to the motor 22 in accordance with a command from the CPU 60. The output circuit 62 includes a first relay driving transistor 90, a second relay driving transistor 92, the first relay 94, the second relay 96, and resistors 98, 100, 102, and 104. Hereinafter, the first relay driving transistor 90 is also referred to as the "first transistor 90". The second relay driving transistor 92 is also referred to as the "second transistor 92". A basic operation of the output circuit 62 can be set similar to that of Japanese Unexamined Patent Application Publication No. 2001-014001, the entire contents of which are incorporated herein by reference.

When a driving signal Sd1 (a first relay driving signal Sd1) from the CPU 60 is inputted into the first transistor 90 (a first coil switch), the first relay 94 is turned on. That is, when the first transistor 90 is turned on by the driving signal Sd1, current is supplied to a coil 106 of the first relay 94 and a moving piece 108 (a movable contact) made of metal is moved from a fixed contact 110 to a fixed contact 112. Accordingly, power from the power source 20 is supplied to the motor 22 via the motor power line 26 and the motor 22 rotates in the opening direction.

In a similar manner, when a driving signal Sd2 (a second relay driving signal Sd2) from the CPU 60 is inputted into the second transistor 92 (a second coil switch), the second relay 96 is turned on. That is, when the second transistor 92 is turned on by the driving signal Sd2, current is supplied to a coil 114 of the second relay 96 and a moving piece 116 (a movable contact) made of metal is moved from a fixed contact 118 to a fixed contact 120. Accordingly, power from the power source 20 is supplied to the motor 22 via the motor power line 26 and the motor 22 rotates in the closing direction.

(A1-6-4. Output Monitoring Circuit 64)

The output monitoring circuit 64 monitors whether or not the motor 22 is rotating and a rotation direction at the time of rotation. As illustrated in FIG. 1, the monitoring circuit 64 is connected between the first relay 94 and the motor 22 and between the second relay 96 and the motor 22 and detects current Im (hereinafter, also referred to as the "motor current Im") which flows into the motor 22. Further, the monitoring circuit 64 determines whether or not the motor 22 is rotating and the rotation direction at the time of rotation based on the current Im. The current Im for rotating the motor 22 in the opening direction (or the normal rotation direction) is set to have a positive value and the current Im for rotating the motor 22 in the closing direction (or the reverse rotation direction) is set to have a negative value in this example, but these may be set reversely.

(A1-6-5. Step-Down Circuit 66)

The step-down circuit 66 is disposed on the CPU power line 28. The step-down circuit 66 steps down a voltage Vb from the power source 20 (hereinafter, also referred to as the "power source voltage Vb") to an operation voltage of the CPU 60 and outputs the voltage Vb which is stepped down.

(A1-6-6. Backup Circuit 68)

The backup circuit 68 is a circuit for securing power supply to the CPU 60 even if the CPU power line 28 is disconnected when an on-failure occurs in the first relay 94 or the second relay 96. The backup circuit 68 includes a CPU side switch 130, a bypass circuit 132 including a resistor 134, and a backup switch 136.

When an input signal (a backup operation signal) is inputted into the CPU side switch 130 (a CPU side transistor) from the backup control unit 82 of the CPU 60, current is supplied via the bypass circuit 132. Accordingly, the backup switch 136 (a backup transistor) is turned on and current flows from the motor power line 26 to the CPU power line 28.

Here, as illustrated in FIG. 1, the backup circuit 68 is connected on the downstream side of the first fuse 50 and the downstream side of the second fuse 52.

(A1-6-7. First Capacitor 70 and Second Capacitor 72)

The first capacitor 70 (hereinafter, also referred to as the "capacitor 70") is grounded between the power source 20 and the step-down circuit 66 and is charged with the power source voltage Vb. The second capacitor 72 (hereinafter, also referred to as the "capacitor 72") is grounded between the step-down circuit 66 and the CPU 60 and is charged with a voltage (a CPU operation voltage) stepped down by the step-down circuit 66.

A2. Control in this Embodiment (A2-1. Slide Door Basic Control)

Figure 2:
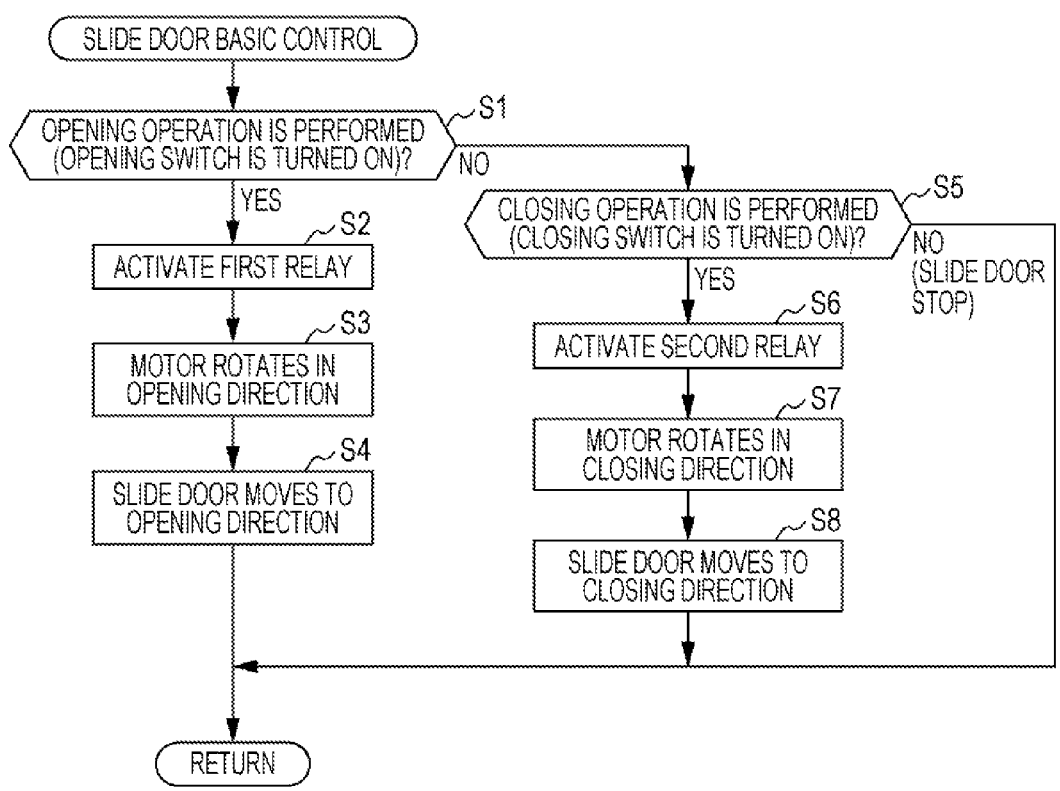
FIG. 2 is a flowchart of slide door basic control in the embodiment.

FIG. 2 is a flowchart of slide door basic control in this embodiment. As described above, the basic control is control for opening/closing the slide door 14 in response to an operation with respect to the switches 40 and 42 by a user. The basic control is executed by the slide door basic control unit 80 of the CPU 60.

In step S1 of FIG. 2, the CPU 60 determines whether or not an opening operation of the slide door 14 is performed by a user. In other words, the CPU 60 determines whether or not the opening switch 40 is turned on by a user. When the opening operation is performed (S1: YES), the CPU 60 activates the first relay 94 for opening in step S2. Accordingly, power from the power source 20 (power source power Pb) is supplied to the motor 22 via the first relay 94, the motor 22 rotates in the opening direction (S3), and the slide door 14 moves to the opening direction (S4).

Returning to step S1, in a case where the opening operation is not performed by a user (S1: NO), the CPU 60 determines whether or not a closing operation of the slide door 14 is performed by a user in step S5. In other words, the CPU 60 determines whether or not the closing switch 42 is turned on by a user. When the closing operation is performed (S5: YES), the CPU 60 activates the second relay 96 for closing in step S6. Accordingly, the power source power Pb is supplied to the motor 22 via the second relay 96, the motor 22 rotates in the closing direction (S7), and the slide door 14 moves to the closing direction (S8).

(A2-2. On-Failure Monitoring Control)

Figure 3:
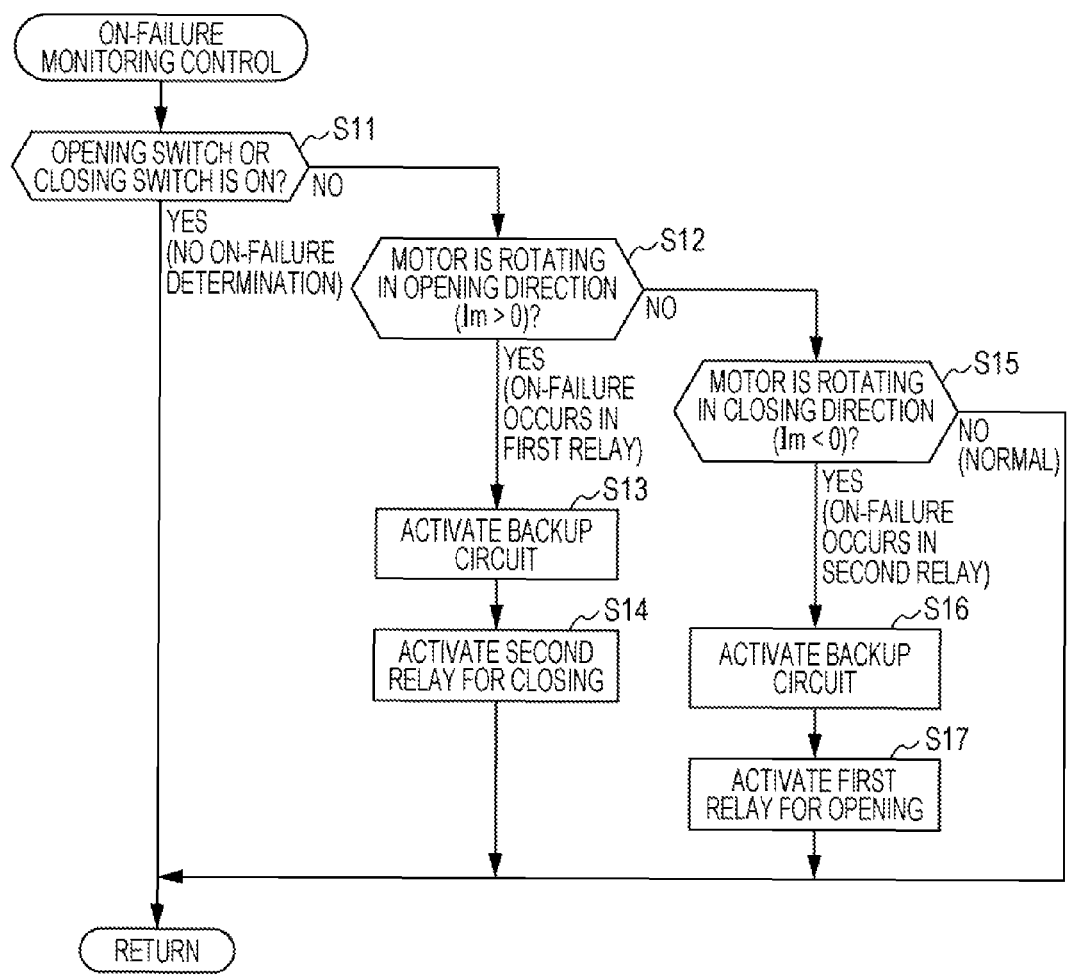
FIG. 3 is a flowchart of on-failure monitoring control in the embodiment.

FIG. 3 is a flowchart of on-failure monitoring control in this embodiment. As described above, the monitoring control is control for monitoring an occurrence of an on-failure in the output circuit 62 and stopping the motor 22 when an occurrence of an on-failure is detected. The monitoring control is executed by the backup control unit 82 of the CPU 60.

In step S11 of FIG. 3, the CPU 60 determines whether or not the opening switch 40 or the closing switch 42 is on. When the opening switch 40 or the closing switch 42 is on (S11: YES), the CPU 60 ends the current processing without performing on-failure determination subsequent and the process returns to step S11 after the elapse of a predetermined period. When the opening switch 40 or the closing switch 42 is not on (S11: NO), the process goes to step S12.

In step S12, the CPU 60 determines whether or not the motor 22 is rotating in the opening direction based on an input from the monitoring circuit 64. The determination of whether or not the motor 22 is rotating in the opening direction is performed based on whether or not the motor current Im has a positive value.

When the motor 22 is rotating in the opening direction (S12: YES), an on-failure has occurred in the first relay 94. Therefore, the CPU 60 turns on the CPU side switch 130 of the backup circuit 68 so as to activate the backup circuit 68 in step S13. In addition, the CPU 60 outputs the driving signal Sd2 to the second transistor 92 to activate the second relay 96 for closing in step S14. Thus, the second relay 96 as well as the first relay 94 is turned on to form a closing circuit and therefore, the motor current Im does not flow. Accordingly, even if an on-failure occurs in the first relay 94, it is possible to stop the motor 22.

Returning to step S12, in a case where the motor 22 is not rotating in the opening direction (S12: NO), the CPU 60 determines whether or not the motor 22 is rotating in the closing direction based on an input from the monitoring circuit 64 in step S15. The determination of whether or not the motor 22 is rotating in the closing direction is performed based on whether or not the motor current Im has a negative value.

When the motor 22 is rotating in the closing direction (S15: YES), an on-failure has occurred in the second relay 96. Therefore, the CPU 60 turns on the CPU side switch 130 of the backup circuit 68 so as to activate the backup circuit 68 in step S16. In addition, the CPU 60 outputs the driving signal Sd1 to the first transistor 90 to activate the first relay 94 for opening in step S17. Thus, the first relay 94 as well as the second relay 96 is turned on to form a closing circuit and therefore, the motor current Im does not flow. Accordingly, even if an on-failure occurs in the second relay 96, it is possible to stop the motor 22.

Returning to step S15, in a case where the motor 22 is not rotating in the closing direction (S15: NO), it can be determined that an on-failure has not occurred in either of the first relay 94 and the second relay 96 (a normal condition). Therefore, the CPU 60 ends the current processing without performing on-failure determination subsequently and the process returns to step S11 after the elapse of a predetermined period.

A3. Advantageous Effects in this Embodiment

According to the embodiment described above, in a case where a state in which the motor 22 is rotating in the opening direction (a first direction) even though the first relay 94 is not activated (that is, an on-failure state of the first relay 94) is generated (S11: NO→S12: YES in FIG. 3), the second relay 96 is activated (S14). A closing circuit is thus formed so as to be able to stop the motor 22. At this time, power supply to the CPU 60 (a control unit) is secured by activating the backup circuit 68 (S13) even if the CPU power line 28 (a control unit power line) is disconnected. Thus, even when the CPU power line 28 is disconnected, the motor 22 can be securely stopped in the on-failure state of the first relay 94. The same goes for a case of generation of a state in which the motor 22 is rotating in the closing direction (a second direction) even when the second relay 96 is not activated (that is, an on-failure state of the second relay 96) (S11: NO→S15: YES).

In this embodiment, the first fuse 50 is disposed on the motor power line 26 and the second fuse 52 the rated current of which is smaller than that of the first fuse 50 is disposed on the CPU power line 28 (the control unit power line) (FIG. 1). The backup circuit 68 is connected between the downstream side of the first fuse 50 and the downstream side of the second fuse 52 (FIG. 1).

Due to the rated current smaller than that of the first fuse 50, the second fuse 52 easily blows. According to the above-described configuration, the backup circuit 68 is connected on the downstream side of the second fuse 52. Therefore, even if the CPU power line 28 is disconnected due to blowing of the second fuse 52, the motor 22 can be securely stopped in the on-failure state of the first relay 94 or the second relay 96.

In this embodiment, the first capacitor 70 and the second capacitor 72 which are grounded between the backup circuit 68 and the CPU 60 (the control unit) are provided on the CPU power line 28 (the control unit power line) (FIG. 1). Accordingly, even if the second fuse 52 of the CPU power line 28 blows, the CPU 60 can activate the backup circuit 68 to maintain the operation of the CPU 60 while the CPU 60 is run by power of the first capacitor 70 and/or the second capacitor 72. Therefore, even if the CPU power line 28 is disconnected due to blowing of the second fuse 52, for example, the motor 22 can be securely stopped in the on-failure state of the first relay 94 or the second relay 96.

On the CPU power line 28 (the control unit power line) of this embodiment, the step-down circuit 66 which steps down the voltage of the CPU power line 28 is provided between the backup circuit 68 and the CPU 60 (the control unit) (FIG. 1). The second capacitor 72 is grounded between the step-down circuit 66 and the CPU 60 (FIG. 1). Accordingly, the second capacitor 72 is charged with a voltage stepped down by the step-down circuit 66. Even in a case where an operation of the step-down circuit 66 momentarily becomes unstable because the CPU power line 28 (the control unit power line) is disconnected on the upstream side of the step-down circuit 66, for example, the CPU 60 can stably operate due to power supply from the second capacitor 72 with a voltage which is already stepped down.

B. Modification

Needless to say, the present disclosure is not limited to the above-described embodiment and various configurations may be employed based on the content of the description of this specification. For example, the following configurations may be employed.

B1. Application Object

In the above-described embodiment, the example in which the backup controller according to the present disclosure is applied as the slide door opening/closing device 12 with respect to the vehicle 10 is described (FIG. 1). However, when the on-failure monitoring control (FIG. 3) is focused on, for example, the application is not limited to this example. For example, the backup controller according to the present disclosure can be applied to other purposes (a power window, a tail gate, an electric power steering (EPS) device, and so forth) in the vehicle 10, as well. Alternatively, the backup controller according to the present disclosure can also be applied to other devices which control an operation in the normal rotation direction and the reverse rotation direction of the motor 22 (a manufacturing device, an elevator, an escalator, and so forth, for example).

B2. Backup Controller 12

(B2-1. Motor Power Line 26 and CPU Power Line 28)

In the above-described embodiment, the rated current of the second fuse 52 provided on the CPU power line 28 is set smaller than that of the first fuse 50 provided on the motor power line 26. However, when monitoring of the on-failure of the first relay 94 and the second relay 96 is focused on, for example, rated current of the power line is not limited to this example. For example, the rated current of the first fuse 50 and the rated current of the second fuse 52 may be set equal to each other.

In the above-described embodiment, the first fuse 50 and the second fuse 52 are provided to the motor power line 26 and the CPU power line 28 respectively (FIG. 1). However, when monitoring of the on-failure of the first relay 94 and the second relay 96 is focused on, for example, the configuration is not limited to this example. For example, one or both of the first fuse 50 and the second fuse 52 can be omitted.

(B2-2. ECU 30)

(B2-2-1. CPU 60)

Though it is assumed that the CPU 60 is constituted of digital circuits (FIG. 1) in the above-described embodiment, the CPU 60 may be partially or entirely constituted of analog circuits.

(B2-2-2. Output Monitoring Circuit 64)

In the above-described embodiment, the monitoring circuit 64 determines the rotation direction of the motor 22 based on the motor current Im (S12 and S15 in FIG. 3). However, from the perspective of determination of the rotation direction of the motor 22, for example, determination by the monitoring circuit is not limited to this example. For example, the monitoring circuit 64 may determine the rotation direction of the motor 22 by using a detected value of a position sensor which detects a position of the slide door 14.

(B2-2-3. Step-Down Circuit 66)

In the above-described embodiment, since the operation voltage of the CPU 60 (the CPU operation voltage) is lower than the operation voltage of the motor 22 (the power source voltage Vb), the step-down circuit 66 is provided (FIG. 1). However, in a case where the operation voltage of the motor 22 and the operation voltage of the CPU 60 are equal to each other, for example, the step-down circuit 66 can be omitted.

(B2-2-4. Backup Circuit 68)

In the above-described embodiment, the backup circuit 68 is connected on the downstream side of the first fuse 50 on the motor power line 26 (FIG. 1). However, from the perspective of connection between the motor power line 26 and the CPU power line 28 via the backup circuit 68, for example, the configuration is not limited to this example. For example, the backup circuit 68 can be provided on the upstream side of the first fuse 50 on the motor power line 26.

In a similar manner, in the above-described embodiment, the backup circuit 68 is connected on the downstream side of the second fuse 52 on the CPU power line 28 (FIG. 1). However, from the perspective of connection between the motor power line 26 and the CPU power line 28 via the backup circuit 68, for example, the configuration is not limited to this example. For example, the backup circuit 68 can be provided on the upstream side of the second fuse 52 on the CPU power line 28.

The backup circuit 68 of the above-described embodiment includes the CPU side switch 130, the bypass circuit 132 (including the resistor 134), and the backup switch 136 (FIG. 1). However, from the perspective of connection between the motor power line 26 and the CPU power line 28 via the backup circuit 68, for example, the configuration is not limited to this example. For example, the configuration in which a driving signal is directly inputted into the backup switch 136 from the CPU 60 (the configuration in which the CPU side switch 130 and the bypass circuit 132 are omitted) can be employed, as well.

In the above-described embodiment, the backup circuit 68 is provided (FIG. 1). However, when such point is focused on that the motor 22 is stopped by driving the other relay in an occurrence of the on-failure of the first relay 94 or the second relay 96 (S14 and S17 in FIG. 3), for example, the backup circuit 68 can be omitted. In this case, it can be said that the present disclosure relates to a motor monitoring device or a motor controller rather than the backup controller.

(B2-2-5. First Capacitor 70 and Second Capacitor 72)

In the above-described embodiment, two capacitors 70 and 72 are provided (FIG. 1). However, when use of the backup circuit 68 is focused on, for example, one or both of the capacitors 70 and 72 can be omitted.

(B2-3. First Switch 40 and Second Switch 42)

In the above-described embodiment, the first switch 40 and the second switch 42 are operable by a user. However, from the perspective of monitoring of the on-failure of the first relay 94 and the second relay 96, for example, the switches are not limited to this example. For example, the first switch 40 and the second switch 42 may be automatically turned on/off in the vehicle 10.

What is claimed is:

1. A backup controller comprising:
   a power source;
   a motor;
   a first switch and a second switch which are operable by a user;
   a controller configured to activate a first relay which rotates the motor in a first direction when the first switch is operated and to activate a second relay which rotates the motor in a second direction which is opposite to the first direction when the second switch is operated;
   a motor power line which connects the power source and the motor so as to supply power to the motor when the first relay or the second relay is activated;
   a controller power line which connects the power source and the controller so as to supply power to the controller;
   a backup circuit configured to supply power from the motor power line to the controller power line when the backup circuit is activated by the controller; and
   a rotation direction monitor configured to detect and monitor the rotation direction of the motor and transmits a detected result with respect to the rotation direction to the controller; wherein
   the controller is configured to:
      activate the second relay and the backup circuit in a case where the rotation direction detected by the monitor is the first direction even though the first relay is not activated; and
      activate the first relay and the backup circuit in a case where the rotation direction detected by the monitor is the second direction even though the second relay is not activated.

2. The backup controller according to claim 1, further comprising:
a first fuse disposed on the motor power line; and
a second fuse disposed on the controller power line and having rated current which is smaller than that of the first fuse,
wherein the backup circuit is connected between a downstream side or an upstream side of the first fuse and a downstream side of the second fuse.

3. The backup controller according to claim 2, further comprising:
a capacitor provided on the controller power line and grounded between the backup circuit and the controller.

4. The backup controller according to claim 3, further comprising:
a step-down circuit provided on the controller power line between the backup circuit and the controller and configured to step down a voltage of the controller power line,
wherein the capacitor is grounded between the step-down circuit and the controller.

* * * * *